United States Patent
Julian et al.

(10) Patent No.: US 8,020,581 B1
(45) Date of Patent: Sep. 20, 2011

(54) SECONDARY DRAINAGE FUNNEL FOR A LAUNDRY BOX

(75) Inventors: Frank D. Julian, Kansas City, MO (US); Truman J. Stegmaier, Lee's Summit, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 649 days.

(21) Appl. No.: 11/679,369

(22) Filed: Feb. 27, 2007

(51) Int. Cl.
*F16L 5/00* (2006.01)
*E03C 1/042* (2006.01)
*D06F 39/00* (2006.01)

(52) U.S. Cl. .................. 137/360; 68/208; 4/695

(58) Field of Classification Search .............. 137/356, 137/357, 360, 216; 312/242, 229; 4/695; 220/3.2, 3.3, 3.9, 3.92, 3.94; 68/208
See application file for complete search history.

(56) References Cited

U.S. PATENT DOCUMENTS

| | | | |
|---|---|---|---|
| 3,411,524 A * | 11/1968 | Raine et al. ............... | 137/216 |
| 6,125,881 A | 10/2000 | Hobbs et al. | |
| 6,148,850 A | 11/2000 | Kopp et al. | |
| 6,189,558 B1 * | 2/2001 | Traylor ................... | 137/216 |
| 6,234,193 B1 | 5/2001 | Hobbs et al. | |
| 6,453,931 B1 * | 9/2002 | Traylor ................... | 137/216 |
| 6,845,785 B1 | 1/2005 | Condon | |
| 2005/0067017 A1 | 3/2005 | Condon et al. | |

OTHER PUBLICATIONS

Advertising materials of J.H. Verneco, Inc. downloaded from www.abetterairgap.com showing VA4 and VA2 air gaps, believed to have been on sale for more than one year prior to the filing date of the present application.
Advertising materials of Air Gap International, Inc. downloaded from www.airgap.com showing Gap-It (TM) water softener air gap, believed to have been on sale for more than one year prior to the filing date of the present application.
Advertising materials of Air Gap International, Inc. downloaded from www.airgap.com showing Gap-Cap (TM) water softener air gap, believed to have been on sale for more than one year prior to the filing date of the present application.

* cited by examiner

*Primary Examiner* — Stephen M Hepperle
*Assistant Examiner* — Atif Chaudry
(74) *Attorney, Agent, or Firm* — Erickson, Kernell, Derusseau & Kleypas, LLC

(57) ABSTRACT

A secondary drainage funnel for use in combination with a laundry box having a bottom wall with a drain opening formed therein includes a generally hollow body having an upper end and a lower end. The upper end includes an inlet opening for receiving a secondary drainage discharge tube. The lower end has a discharge opening formed therein and is shaped to be supported on the lower wall of the laundry box proximate the drain opening with the discharge opening in fluid communication with the drain opening while leaving sufficient access to the drain opening to allow a laundry drain hose to be inserted therein.

20 Claims, 4 Drawing Sheets

SECONDARY DRAINAGE FUNNEL FOR A LAUNDRY BOX

BACKGROUND OF THE INVENTION

1. Field of the Invention

This invention relates to utility boxes such as those used to provide access to drain and supply lines in a wall, and in particular to a funnel for connecting a secondary drainage line, such as a condensate line from an appliance, to the same drain line to which a washing machine is also connected.

2. Description of the Related Art

Washing machines are typically provided with connections for hot and cold water supply hoses and with a drain hose through which waste water is expelled. These hoses need to be connected to respective hot and cold water supply lines and to a drain line. The supply lines and drain line are typically located inside a wall in stud bays formed between respective wall studs. A laundry box is used to provide access to the supply lines and drain line through a finished wall so that the respective hoses can be connected.

A typical laundry box comprises a box having a pair of side walls, top and bottom end walls, a back wall and an open front or face. The bottom wall will include a drain opening through which the drain line can be accessed. A pair of supply line openings for admitting the supply lines into the box are formed in either the top or bottom wall, depending upon the direction from which the supply lines are plumbed. Hot and cold water shut-off valves are mounted inside the box in communication with the respective hot and cold supply lines. Mounting flanges are generally provided on the box for connecting it to one or more nearby wall studs. Wallboard is fastened to the wall studs, leaving a wall opening aligned with the front of the laundry box. When a washing machine is installed, the hot and cold supply hoses are run into the laundry box through the wall opening and connected to the respective hot and cold shut-off valves. Similarly, the washing machine drain hose is run into the laundry box through the wall opening and inserted into the drain line through the drain opening.

Other types of appliances and household systems produce secondary drainage which needs to be drained off, preferably into a drain line. For example, air conditioners, high efficiency furnaces and the like, produce liquid condensation. Other systems, such as water softeners and reverse osmosis water purification systems also produce secondary drainage. Often, it would be convenient to connect a drain hose from one of these sources of secondary drainage to a drain line through a laundry box, however conventional laundry boxes are not equipped to receive two drain hoses (one from a washing machine and one from a source of secondary drainage) simultaneously.

This problem has been previously addressed by providing a laundry box with dual drain openings which are both then connected to a drain line using a wye or other adapter positioned below the laundry box. One of the outlets can then be used for the laundry drain hose and the other can be used for connecting a drain hose for secondary drainage. Laundry boxes of this type are disclosed by U.S. Pat. Nos. 6,125,881 and 6,148,850. A problem with laundry boxes of this type is that the addition of the extra drain outlet makes them unnecessarily large and therefore impractical to install in tight spaces.

SUMMARY OF THE INVENTION

The present invention comprises a secondary drainage funnel for use in combination with a laundry box having a bottom wall with a drain opening formed therein and a top wall opposite the bottom wall. The funnel includes a generally hollow body having an upper end and a lower end. The upper end includes an inlet opening for receiving a secondary drainage discharge tube and is preferably sized and shaped to extend through an upper opening formed through the top wall of the laundry box opposite the drain opening. The lower end has a discharge opening formed therein and is shaped to be supported on the lower wall of the laundry box proximate the drain opening with the discharge opening in fluid communication with the drain opening while leaving sufficient access to the drain opening to allow a laundry drain hose to be inserted therein.

The lower end preferably includes coaxial arcuate front and rear walls with said discharge opening being formed therebetween. The rear wall has an inner radius selected to be approximately equal to the radius of the drain opening and the front wall has an outer radius selected to be less than the radius of the drain opening. The front wall above the lower end is gradually inwardly curved toward the lower end to aid in guiding a laundry discharge hose into the drain opening.

The funnel also includes a vent portion intermediate the upper and lower ends. The vent portion includes a plurality of vent opening extending through the front wall of the funnel. The vent portion further includes a splash guard spaced inwardly from the front wall and partially covering the vent openings.

DETAILED DESCRIPTION OF THE PREFERRED EMBODIMENTS

Figure 1:
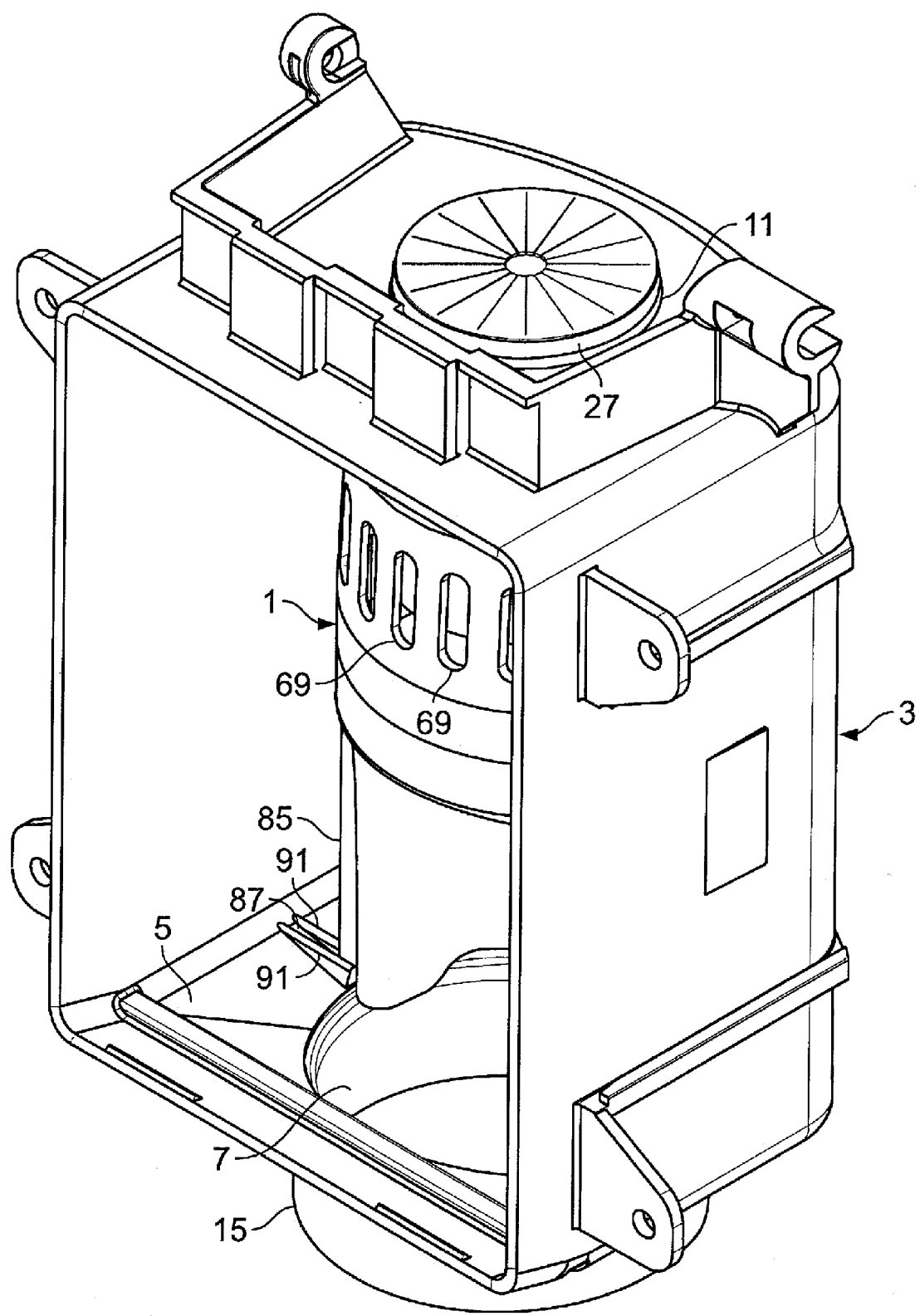
FIG. 1 is a perspective view of a secondary drainage funnel according to the present invention mounted in a laundry box.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 6:
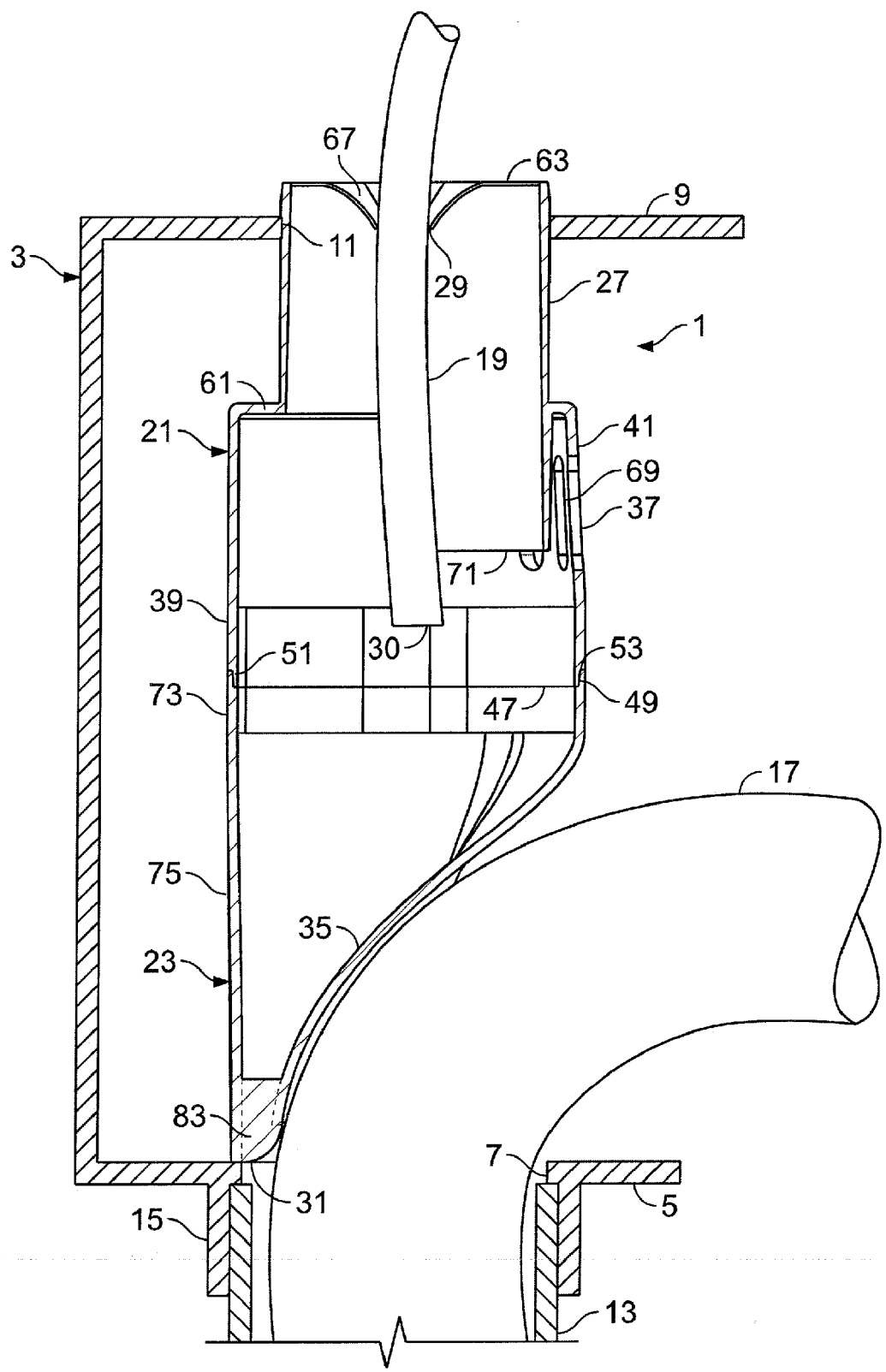
FIG. 6 is a cross-sectional view of the secondary drainage funnel taken generally along line 6-6 in FIG. 3 and showing a secondary drainage discharge tube and a laundry discharge hose in use therewith.

Referring to the drawings in more detail, and in particular to FIGS. 1 and 6, the reference number 1 generally designates a secondary drainage funnel according to the present invention. The secondary drainage funnel 1 is used in combination with a laundry box 3 having a bottom wall 5 with a drain opening 7 formed therein and a top wall 9 having an upper opening 11 extending therethrough in axial alignment with the drain opening 7. The drain opening 7 is adapted for connection to a drain line 13 and includes a sleeve or collar 15 which extends downward from the bottom wall 5 around the drain line opening 7 and is sized to accept the drain line 13. The drain line 13 can be attached to the collar 15 by use of a cement or other adhesive. The drain line 13 may be, for example 2" NPS (Nominal Pipe Size) PVC (polyvinyl chloride) or ABS (acrylonitrile butadiene styrene) drain pipe having an outside diameter of 2.375 inches.

As best seen in FIG. 6, the secondary drainage funnel 1 is designed to mount inside the laundry box 3 and to allow simultaneous connection of a laundry drain hose 17 from a washing machine and a secondary drainage discharge tube 19 from a source of secondary drainage to the drain line 13 through the drain opening 7. Laundry drain hoses 17 typically have outside diameters from 0.875 inches to 1.15 inches, or radiuses of 0.438" to 0.575".

Figure 2:
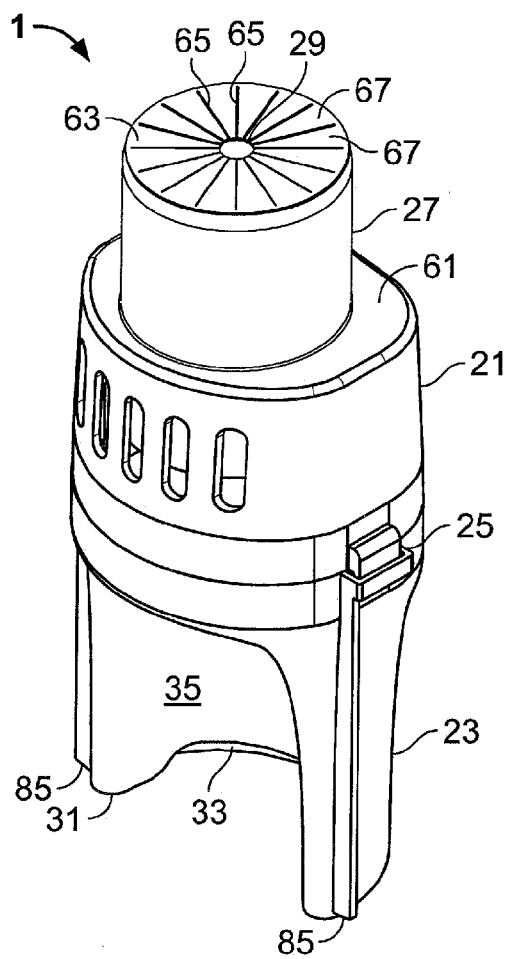
FIG. 2 is a perspective view of the secondary drainage funnel.
Figure 3:
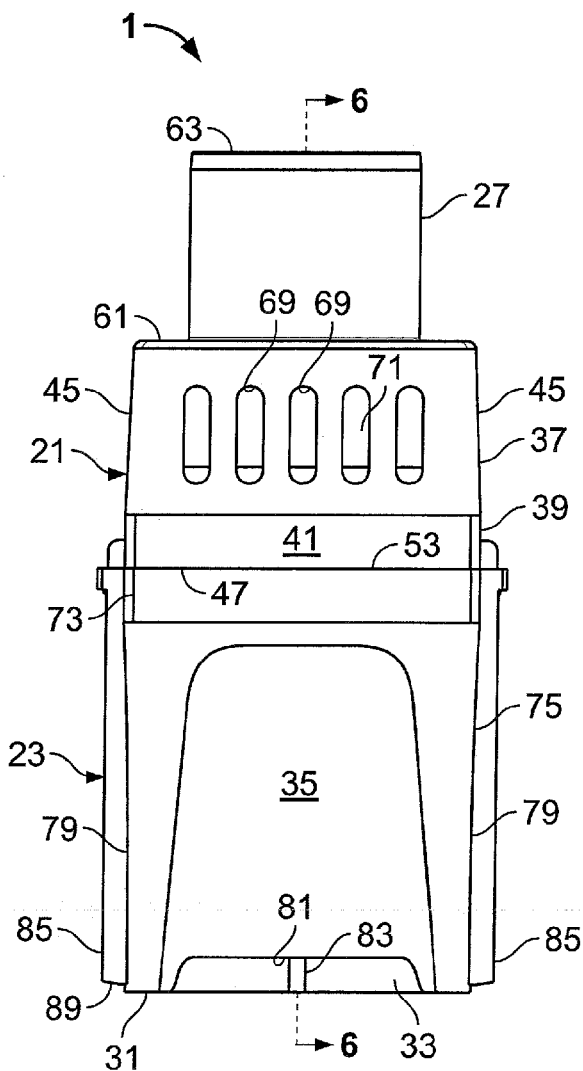
FIG. 3 is a front elevational view of the secondary drainage funnel.
Figure 5:
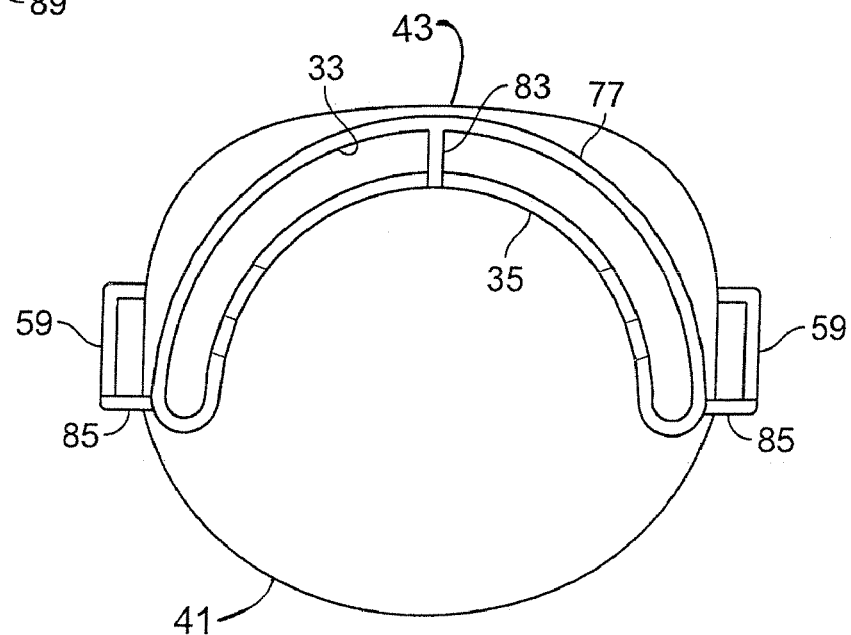
FIG. 5 is a bottom plan view of the secondary drainage funnel.

Referring to FIG. 2, the funnel 1 is formed of molded plastic and generally includes an upper section 21 and a lower section 23 which are connected by snaps 25. The upper section 21 includes an upper cylindrical extension 27 which is preferably sized and shaped to extend through the upper opening 11 in the top wall 9 of the laundry box 3. The upper extension 27 includes an inlet 29 which receive a discharge end 30 of the secondary drainage discharge tube 19. The lower section 23 includes a lower end 31 which rests on the bottom wall of the laundry box 3 around the periphery of the drain opening 7. The lower end 31 includes a discharge opening 33 through which secondary drainage is discharged into the drain line 13. A front wall 35 of the lower section 23 is deformed inwardly such that the drain opening 7 is not blocked and can still receive the laundry drain hose 17. As a result of the deformation of the front wall 35, the discharge opening 33 has an arcuate shape (as best seen in FIG. 5).

Looking at the secondary drainage funnel 1 in more detail, and referring to FIGS. 3-6, the upper section 21 includes the upper cylindrical extension 27, a vent portion 37 below the cylindrical extension 27 and an upper coupling portion 39 below the vent portion 37. The vent portion 37 and upper coupling portion 39 are generally ovate and share a rounded front wall 41, a somewhat flatter rear wall 43, and sides 45. In the upper coupling portion 39, the front wall 41, rear wall 43 and sides 45 are generally vertical. In the vent portion 37, the front wall 41, rear wall 43 and sides 45 taper inwardly from bottom to top.

The upper coupling portion 39 extends upwardly from a lower edge 47 which adjoins the lower section 23 of the funnel 1 when the two sections are connected. As best seen in FIG. 6, the lower edge 47 includes a downwardly extending circumferential flange 49 which is set inwardly from the outer surface of the upper section 21. The circumferential flange 49 is engageable with a rabbet 51 formed in an upper edge 53 of the lower section 23.

Figure 4:
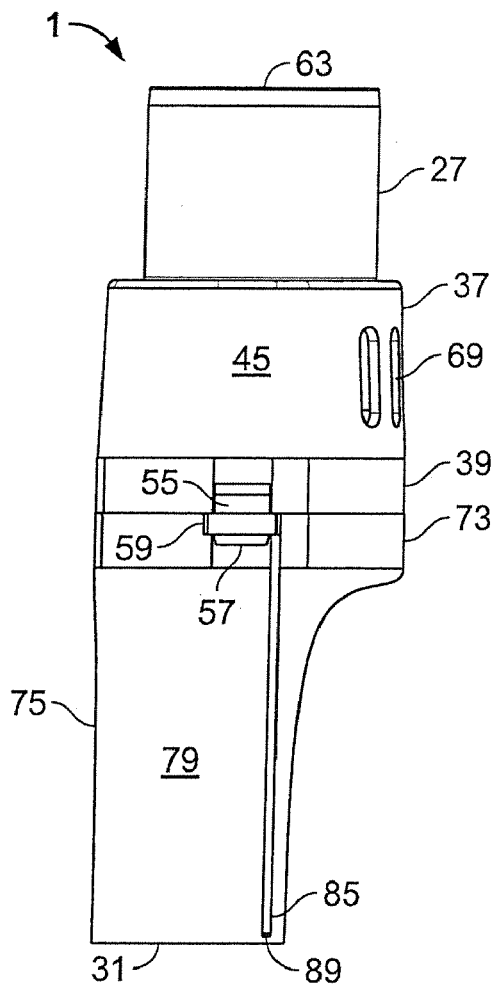
FIG. 4 is a side elevational view of the secondary drainage funnel.

Referring to FIG. 4, the snaps 25 for connecting the upper section 21 to the lower section 23 are positioned on the sides 45 of the upper coupling portion 39 and include a pair of downwardly extending flexible snap arms 55. Each snap arm 55 includes an outwardly extending barb 57 on its distal end. When the upper section 21 is connected to the lower section 23, the snap arms 55 each extend through a respective loop 59 on the lower section 23 and the barbs 57 each engage a lower surface of the respective loop 59 to retain the upper and lower sections together.

The vent portion 37 extends upwardly from the upper coupling portion 39 to an inwardly extending annular flange 61. The upper cylindrical extension 27 extends upwardly from the annular flange 61 and terminates in an end wall 63 through which the inlet 29 is formed. The inlet 29 is preferably in the form of an iris having radially extending slits 65 defining fingers 67 (see FIG. 2) which deform to admit secondary drainage discharge tubes 19 of various sizes. The upper cylindrical extension 27 has an outer diameter sized to be tightly received within the upper opening 11 of the laundry box 3.

The front wall 41 of the vent portion 37 includes a plurality of vent openings 69 which serve two functions, one of which is to vent contaminated water in case of a sewage backup. The second function is to allow a building inspector to look inside the funnel 1 and verify that a sufficient air gap exists between the end of the secondary drainage discharge tube 19 and the discharge opening 33. An air gap is required by building codes in order to prevent sewage from backing up into the secondary drainage source. A splash guard 71 extends downwardly from the annular flange 61 inside the upper section 21 in spaced relation to the front wall 41 and partially covers the vent openings 69 to prevent secondary drainage from splashing out, but still allows for a visual inspection of the air gap.

Referring again to FIGS. 3-6, the lower section 23 includes a lower coupling portion 73 and a funnel portion 75. The lower coupling portion 73 and funnel portion 75 share the front wall 35, a rear wall 77 and sides 79. In the lower coupling portion 73, the front wall 35, rear wall 77 and sides 79 are generally vertical and shaped to conform with the respective front wall 41, rear wall 43 and sides 45 of the upper coupling portion 39. The lower coupling portion 73 extends downwardly from the upper edge 53 and includes the rabbet 51 which is engageable with the circumferential flange 49 formed in the lower edge 47 of the upper section 21. The lower coupling portion 73 also includes the loops 59 which are mounted on the opposed sides 79 and are engageable by the snap arms 55 of the upper section 21.

In the funnel portion 75, the sides 79 and rear wall 77 taper inwardly from the lower coupling portion 73 to the lower end 31. As best seen in FIG. 5, at the lower end 31, the rear wall 77 is generally semicircular and sized to rest on the bottom wall 5 of the laundry box 3, around and just outside of the drain opening 7 and in generally axial alignment therewith. The inside radius of the rear wall 77 at the lower end 31 is therefore approximately equal to the radius of the drain opening 7.

The front wall 35 is deformed inwardly in the funnel portion 75 such that at the lower end 31 the front wall 35 also has a generally semicircular shape and is concentric with the rear wall 77. The outer radius of the front wall 35 at the lower end 31 is less than either the inner radius of the rear wall 77 or the radius of the drain opening 7. The discharge opening 33 is defined by the front wall 35 and rear wall 77 at the lower end 31 and consequently as an arcuate or generally semi-annular shape.

When the funnel 1 is positioned in the laundry box 3 over the drain opening 7, secondary drainage from the secondary drainage discharge tube 19 through the discharge opening 33 and into the drain opening 7. In order to increase the amount of secondary drainage which can flow through the discharge opening 33, a relief cut 81 may be made in the front wall 35 proximate the lower end 31 to increase the area of the discharge opening 33.

The front wall 35 is formed so as not to completely block the drain opening 7 and to allow the laundry drain hose 17 to be inserted into the drain opening 7. The inner diameter of the front wall 35 at the lower end 31 is therefore greater than the outside diameter of commonly sized laundry drain hoses 17. The front wall 35 is also gradually curved inwardly from top to bottom in the funnel portion 75 to help guide the laundry hose 17 downwardly into the drain opening 7. An internal septum 83 formed between the front wall 35 and the rear wall 77 prevents the discharge opening 33 from being collapsed by the front wall 35 from being pushed rearwardly as a laundry drain hose 17 is inserted into the drain opening 7.

In an application utilizing a 2" NPS drain line 17 having a 2.375" outside diameter, the rear wall 77 may have an outside radius of 1.1875" and a wall thickness of 0.0625", resulting in an inside radius of 1.125". The front wall 35 may have a 1" outside radius and a 0.0625" wall thickness, resulting in an inside radius of 0.9375", thereby leaving sufficient clearance for any of the commonly used laundry drain hoses 17. The area of the discharge opening 33 on a funnel 1 with these dimensions will be approximately 0.6133 sq. in. Tests indicate that a discharge opening 33 of this size will allow for flow rates of at least four gallons per minute of secondary drainage.

Referring to FIGS. 1-5, the lower end 31 of the funnel 1 may include one or more locating tabs 85 which engage respective slots or grooves 87 in the bottom wall 5 of the laundry box 3 to positively locate the funnel 1 over the drain opening 7. For example, the secondary drainage funnel is shown as having a pair of tabs 85, each of which is located on a respective side 79 of the lower section 23 and extending downwardly from the respective loop 59 to the lower end 31. Each tab 85 has a lower end 89. As seen in FIG. 1, the lower ends 89 are each receivable in a respective slot 87 defined between a pair of stops 91 located on the bottom wall 5 of laundry box 3 and positioned on opposite sides of the drain opening 7.

In use, the funnel 1 may be installed in the laundry box 3 either before or after the laundry box 3 is mounted to one or more studs in a wall using mounting structure provided on the laundry box 3. The funnel 1 is installed by first inserting the upper cylindrical portion 27 of the upper section 21 into the upper opening 11 in the top wall 9 of the laundry box 3. The lower section 23 is then inserted into the laundry box 3 and snapped onto the upper portion 21 using the snaps 25. The funnel 1 is then drawn downwardly until the lower end 31 engages the bottom wall 5 proximate the drain opening 7 and the locating tabs 85 are seated in the slots 87. The discharge end 30 of the secondary drainage line 19 may then be pushed into the inlet opening 29, thereby bending the fingers 67 downwardly. The drain line 19 is pushed into the funnel 1 a distance which is selected to leave an air gap between the discharge end 30 and the drain opening 7 as required by code. The discharge end 30 of the drain line 19 may be observed through the vent openings 69 to make certain that the air gap is sufficient. After the wall is finished and a washing machine is positioned near the laundry box 3, the laundry drain hose 17 may be inserted into the drain opening 7 without interference from the funnel 1.

It is to be understood that while certain forms of the present invention have been illustrated and described herein, it is not to be limited to the specific forms or arrangement of parts described and shown. For example, although the funnel 1 has been described and depicted herein as having an upper cylindrical portion 27 which extends through an upper opening 11 in the top wall 9 of the laundry box 3, with the inlet opening 29 formed in the upper cylindrical portion 27, it is to be understood that in some applications it may be advantageous for the secondary drain line to enter the funnel 1 from another direction, such as through the open front of the laundry box 3. In these applications, the funnel 1 need not extend through the upper wall 9 of the laundry box 3 and may have an inlet opening 29 formed in another location, such as through a front wall of the upper section 21.

What is claimed and desired to be secured by Letters Patent is as follows:

1. In combination, a laundry box and a secondary drainage funnel, said laundry box having a bottom wall with a drain opening formed therein and a top wall opposite said bottom wall and having an upper opening formed therethrough, said secondary drainage funnel comprising a generally hollow body having an upper end and a lower end, said upper end extending through said upper opening in said laundry box and including an inlet opening for receiving a secondary drainage discharge tube, said lower end having a discharge opening formed therein and being supported on said lower wall of said laundry box proximate said drain opening with said discharge opening in fluid communication with said drain opening while leaving sufficient access to said drain opening to allow a laundry drain hose to be inserted therein.

2. The combination as in claim 1 wherein said lower end of said secondary drainage funnel includes an arcuate outer peripheral rear wall and an arcuate inwardly deformed front wall with said discharge opening being formed therebetween and having a generally uniform arcuate profile with said outer peripheral rear wall and said inwardly deformed front wall generally curving about a common point and said outer peripheral rear wall being spaced radially outward from said inwardly deformed front wall.

3. The combination as in claim 2 wherein said outer peripheral wall has an inner radius selected to be approximately equal to the radius of said drain opening and said inwardly deformed front wall has an outer radius selected to be less than the radius of said drain opening.

4. The combination as in claim 2 wherein said inwardly deformed front wall above said lower end is gradually inwardly curved toward said lower end to aid in guiding a laundry discharge hose into said drain opening.

5. The combination as in claim 2 wherein said inwardly deformed front wall includes a relief cut extending upwardly from said lower end to increase a maximum secondary drainage flow through said discharge opening.

6. The combination as in claim 2 and including an inner septum formed between said outer peripheral rear wall and said inwardly deformed front wall.

7. The combination as in claim 1 wherein said inlet opening includes a plurality of radially extending slits defining deformable fingers therebetween.

8. The combination as in claim 1 and further including at least one vent opening extending through a front wall of said hollow body.

9. The combination as in claim 8 and further including a splash guard spaced inwardly from said front wall and partially covering said at least one vent opening.

10. The combination as in claim 1 wherein said body is formed of upper and lower sections removably connected by snaps.

11. A secondary drainage funnel in combination with and for mounting in a laundry box to allow simultaneous connection of a secondary drainage discharge tube and a laundry discharge hose to a drain opening of said laundry box, said secondary drainage funnel comprising:

a) an upper portion extending through an opening formed in a top wall of said laundry box and including a secondary drainage inlet opening; and b) a funnel portion in fluid communication with said upper portion below said upper portion, said funnel portion having an outer peripheral rear wall, an inwardly deformed front wall and a lower end, at said lower end said outer peripheral wall having a concave profile and said inwardly deformed front wall having a convex profile, said outer peripheral rear wall and said inwardly deformed front wall defining an arcuate discharge opening therebetween with said outer peripheral rear wall and said inwardly deformed front wall generally curving about a common point and said outer peripheral rear wall being spaced radially outward from said inwardly deformed front wall.

12. The secondary drainage funnel as in claim 11 wherein said upper portion is cylindrical and said secondary drainage inlet opening is formed through a top wall of said cylindrical portion.

13. The secondary drainage funnel as in claim 11 wherein said inlet opening includes a plurality of radially extending slits defining deformable fingers therebetween, said fingers deforming to admit an end of a secondary drainage tube into an interior of said secondary drainage funnel.

14. The secondary drainage funnel as in claim 11 and further including a vent portion between said upper portion and said lower portion, said vent portion including at least one vent opening extending through a wall of said funnel.

15. The secondary drainage funnel as in claim 14 and further including a splash guard spaced inwardly from said wall having said at least one vent opening extending therethrough and partially covering said at least one vent opening.

16. The secondary drainage funnel as in claim 11 wherein said outer peripheral wall has an inner radius selected to be approximately equal to the radius of the drain opening and said inwardly deformed front wall has an outer radius selected to be less than the radius of the drain opening.

17. The secondary drainage funnel as in claim 11 wherein said inwardly deformed front wall above said lower end is gradually inwardly curved toward said lower end to aid in guiding a laundry discharge hose into the drain opening.

18. The secondary drainage funnel as in claim 1 wherein said inwardly deformed front wall includes a relief cut extending upwardly from said lower end to increase a maximum secondary drainage flow through said discharge opening.

19. The secondary drainage funnel as in claim 11 and including an inner septum formed between said outer peripheral rear wall and said inwardly deformed front wall.

20. The secondary drainage funnel as in claim 11 wherein said body is formed of upper and lower sections removably connected by snaps.

* * * * *